United States Patent [19]

Detloff

[11] Patent Number: 4,680,860

[45] Date of Patent: Jul. 21, 1987

[54] APPARATUS FOR DISASSEMBLING LOCKS

[75] Inventor: John C. Detloff, Richmond, Va.

[73] Assignee: A-1 Security Manufacturing Corp., Richmond, Va.

[21] Appl. No.: 892,269

[22] Filed: Aug. 4, 1986

[51] Int. Cl.$^4$ .............................................. B23P 19/04

[52] U.S. Cl. ...................................... 29/804; 29/281.1

[58] Field of Search ............... 29/281.1, 804; 269/237, 269/900, 43

[56] References Cited

U.S. PATENT DOCUMENTS 952,787 3/1910 Crawford ........................ 269/237 X 2,887,918 5/1959 Benson ........................... 29/281.1 X 3,218,699 11/1965 Maese .............................. 29/804 X 3,417,452 12/1968 Roland ................................. 29/804

*Primary Examiner*—Frederick R. Schmidt
*Assistant Examiner*—Steven P. Schad
*Attorney, Agent, or Firm*—Norman B. Rainer

[57] ABSTRACT

An apparatus for use by locksmiths in disassembling the core of an interchangeable core cylinder lock. The apparatus holds the core securely and precisely, enabling a punch to extrude the springs, driver pins and spacer rods of the pin chambers into retaining chambers. The extruded contents of the pin chambers can then be examined and accurately returned to their respective pin chambers.

7 Claims, 6 Drawing Figures

APPARATUS FOR DISASSEMBLING LOCKS

BACKGROUND OF THE INVENTION

This invention relates to apparatus for use by locksmiths and more particularly concerns apparatus for the orderly and controlled disassembly of interchangeable core locks.

In cylinder locks of conventional design, a cylindrical key-receiving plug having a first series of radially disposed channels is rotatably mounted within a cylindrical bore in a housing having a second, matching series of channels, known as "pin chambers." The pin chambers are in coaxial alignment with the first series of channels, and open upon said bore. The opposite extremities of the pin chambers, furthest from the bore, are closed. Each pin chamber is adapted to confine a coil spring in abutment with said closed extremity, and a driver pin which is urged toward the key-receiving plug by the spring. In many embodiments of such locks, one or more spacer rods may be positioned between the spring and driver pin within the pin chamber. The combined sequence of different spacer rods constitutes a code for opening the lock.

In certain types of cylinder locks, generally referred to as interchangeable core locks, the portion of the housing of the lock which contains the plug and pin chambers is part of an assembly, known as a "core" which is slidably removable from the lock when released by a control key. The controlled removeability of the core is desired by institutions where a high turnover of employees necessitates a periodic change of locks to maintain security. Cores of several different codes may be kept by the institution, all keyed for a single control key but requiring different operating keys to open the locks. On occasion, the keys may be lost, and a locksmith is required to disassemble the lock to ascertain the code and make a replacement key.

The core further contains the cylindrical bore which houses the key receiving plug, and the wall of said bore has a series of apertures axially aligned with the first series of channels and diametrically opposed thereto. The extremities of the pin chambers furthest from the bore are closed by means of friction-fit discs. By virtue of such manner of construction, the springs and driver pins can be extruded from the pin chambers of the removed core by driving a punching tool through the apertures in the wall of the cylindrical bore. In such disassembling techniques, the sequence of the removed components is: friction disc, spring, spacer rods and driver pin. The removed components must be maintained in proper arrangement for individual measurement and subsequent re-insertion into the core. Because of the small size of the components and the necessary precision of their positioning, their handling is difficult.

It is accordingly an object of the present invention to provide apparatus for the precisely controlled removal of components from the pin chambers of removable cores of cylinder locks.

It is another object of this invention to provide apparatus as in the foregoing object which is easily operated and has securing means to prevent inadvertent movement of the core during disassembly.

It is a further object of the present invention to provide apparatus of the aforesaid nature of rugged and durable construction amenable to low cost manufacture.

These objects and other objects and advantages of the invention will be apparent from the following description.

SUMMARY OF THE INVENTION

The above and other beneficial objects and advantages are accomplished in accordance with the present invention by an apparatus for holding a removable core, and receiving pin chamber components extruded therefrom, said apparatus comprising:

(a) a lower member having a flat bottom surface, opposed parallel flat side surfaces rising perpendicularly from said bottom surface, a flat upper surface in parallel disposition to said bottom surface, forward and rear extremities, each extending between said side surfaces, a first series of parallel troughs of uniform semi-circular cross sectional configuration recessed within said upper surface and perpendicularly oriented to said forward and rear extremities, a first elongated recess of cylindric contour extending between said side surfaces adjacent said forward extremity and communicating with said first series of troughs, first pivot means disposed adjacent said rear extremity above said upper surface in perpendicular relationship to said side surfaces, and latch holding means associated with said side surfaces adjacent said forward extremity, and (b) an upper member having a flat bottom surface adapted to lie in abutting contact with the upper surface of said lower member, opposed parallel flat side surfaces perpendicularly disposed to said bottom surface and disposed in coplanar relationship with the side surfaces of said lower member, forward and rear extremities adapted to lie directly above the corresponding extremities of the lower member, a second series of troughs shaped and spaced in a manner to meet with the first series of troughs to form circular cylindrical retaining chambers, a second elongated recess configured to meet with said first recess to form a core-receiving channel of cylindric contour whose cross-section comprises a least 180 degrees of circular arc, said arc being symmetrically disposed about said retaining chambers, said channel having an elongated slot which opens upon the forward extremities of said upper and lower members, locking means adjacent the forward extremity in communication with said second elongated recess, latch means interactive with the latch holding means of the lower member, and second pivot means interactive with said first pivot means to enable the upper member to swing in a vertical path and slide in a horizontal plane with respect to said lower member.

In preferred embodiments, the upper and lower members are of substantially monolithic construction and fabricated of metal by molding or machining techniques. The second pivot means is preferably a slot-like depression or aperture elongated along an axis parallel to the bottom surface of said upper member. The locking means may be a bolt which threadably penetrates the upper member in a direction perpendicular to said bottom surface.

By virtue of the hinged association of the upper and lower members, the apparatus has two operational states, namely an open state wherein the upper member is positioned substantially behind the lower member, and a closed state wherein the upper member is above the lower member, thereby causing the troughs to form said retaining chambers, and causing the recesses to form said channel. In the closed position, the pin chamber portion of a removable core can be slidably inserted into said channel. In a preferred embodiment, the core-receiving channel is provided with positioning means which ensure that the pin chambers of a core inserted into the channel are aligned with said retaining chambers.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
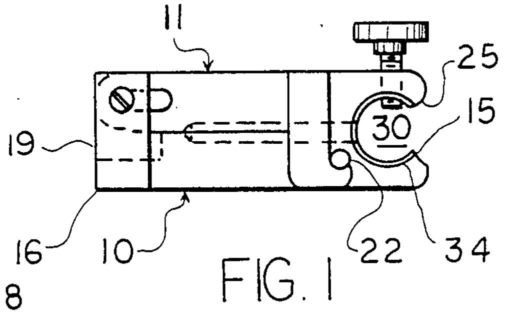
FIG. 1 is a side view of an embodiment of the apparatus of the present invention shown in its closed state.
Figure 2:
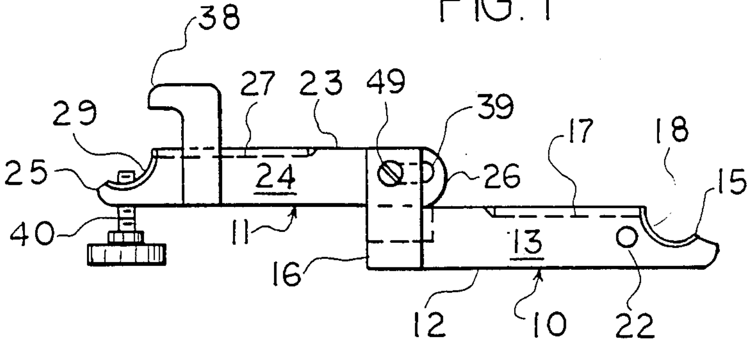
FIG. 2 is a side view of the apparatus of FIG. 1 shown in its open state.

Referring to FIGS. 1 and 2, an embodiment of the apparatus of this invention is shown comprised of lower member 10 in pivotal engagement with upper member 11.

Figure 3:
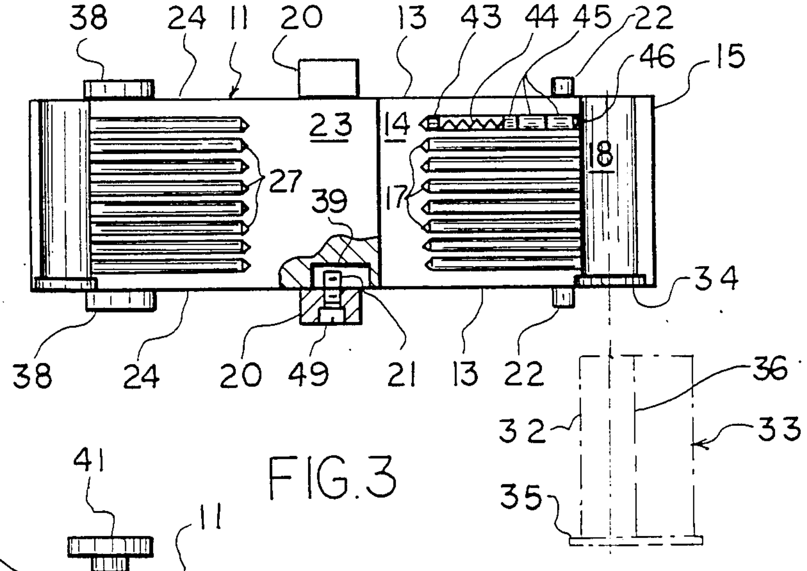
FIG. 3 is a top view of the apparatus of FIG. 2 showing removed pin-chamber components, and with portions broken away to reveal interior details.
Figure 4:
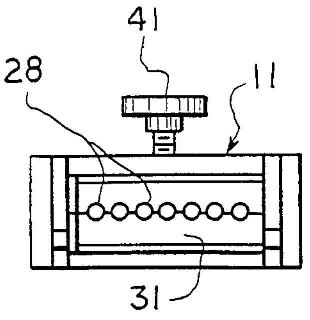
FIG. 4 is an end view taken from the right of FIG. 1.
Figure 5:
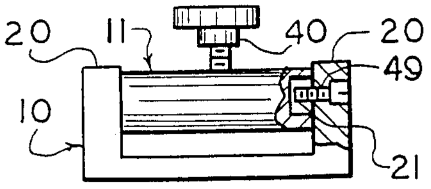
FIG. 5 is an end view taken from the left of FIG. 1, with portions broken away.

Said lower member is of substantially monolithic structure, having been machined from a block of metal, and shaped to have a flat bottom surface 12, opposed parallel flat side surfaces 13 rising perpendicularly from said bottom surface, and a flat upper surface 14 in parallel disposition to said bottom surface. The lower member is further comprised of forward and rear extremities 15 and 16, respectively, each extending in a straight path perpendicularly between said side surfaces. As best shown in FIGS. 2 and 3, a first series of parallel troughs 17 of constant semi-circular cross sectional configuration is recessed within upper surface 14 in perpendicular orientation to said forward and rear extremities. A first elongated recess 18 of cylindric contour extends perpendicularly between said side surfaces adjacent forward extremity 15, and communicates with said parallel troughs 17.

First pivot means 19 is disposed adjacent rear extremity 16, said pivot means being comprised of paired upright posts 20 and facing cylindrical bearing studs 21 centered upon an axis lying above upper surface 14 and in perpendicular relationship to side surfaces 13. The bearing studs are the terminal portions of threaded shanks 49 which engage threaded holes in posts 20. Latch holding means in the form of opposed rods 22 extend outwardly from said side surfaces adjacent forward extremity 15.

Upper member 11 is of substantially monolithic structure, having been machined from a block of metal, and shaped to have a flat bottom surface 23 adapted to lie in abutting contact with upper surface 14 of said lower member. Said upper member is further comprised of opposed parallel flat side surfaces 24 perpendicularly disposed to bottom surface 23 and positioned in coplanar relationship with the side surfaces 13 of said lower member. Forward and rear extremities 25 and 26, respectively, of said upper member are adapted to lie directly above the corresponding extremities of the lower member. A second series of troughs 27 recessed within bottom surface 23 are shaped and spaced in a manner to meet with said first series of troughs to form circular cylindrical retaining chambers 28. A second elongated recess 29, located in bottom surface 23 adjacent forward extremity 25, is configured to meet with first recess 18 to form core-receiving channel 30 of cylindric contour whose cross-section comprises about 200 degrees of circular arc substantially symmetrically disposed about retaining chambers 28.

Figure 6:
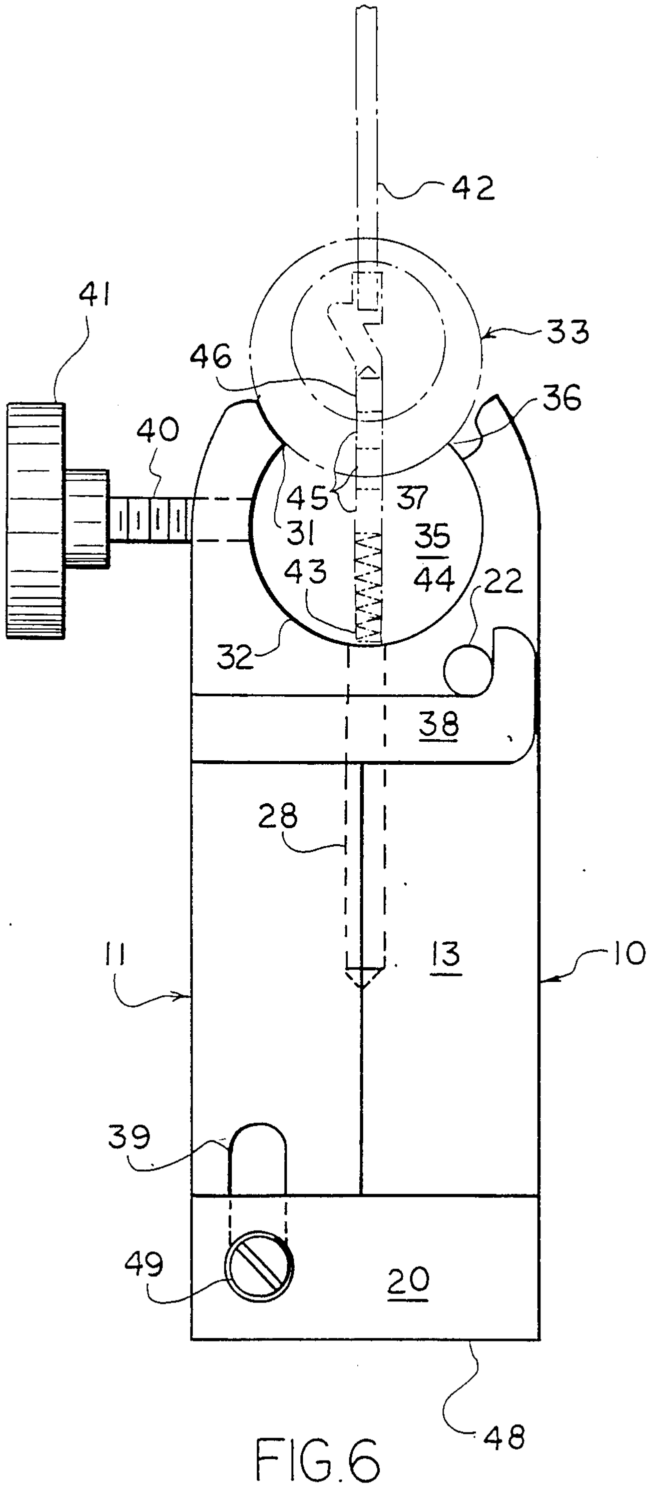
FIG. 6 is a side view such as FIG. 1 shown in association with a replaceable core to illustrate the manner of function of the apparatus.

In other embodiments, the circular arc of channel 30 may range between about 190 and 300 degrees. The uncompleted portion of a complete circular periphery defines an elongated slot 31, parallel to the cylindrical axis of channel 30, which opens upon the forward extremities of said upper and lower members. As shown in FIGS. 3 and 6, channel 30 is adapted to slideably accommodate the cylindrical pin chamber portion 32 of removeable core 33. Positioning means in the form of depressed shoulder 34 is formed adjacent one extremity of channel 30, its purpose being to engage the circular periphery of face plate 35 of core 33 which protrudes beyond the body of contiguous pin chamber portion 32. By virtue of shoulder 34, the axial position of the core within channel 30 is precisely fixed. Furthermore, the forward extremities of said upper and lower members slidably engage the opposed cusps 36 of core 33, thereby precisely fixing the radial position of the core. Because of such positioning features associated with channel 30, the pin chambers 37 of the core are accurately aligned with retaining chambers 28.

Latching means in the form of paired hook-shaped latches 38 fixedly associated with side surfaces 24 are configured to engage opposed rods 22 when the upper member is above the lower member and in its forward-most position representing the closed state of the apparatus. Second pivot means in the form of paired elongated slots 39 formed within said side surfaces 24 adjacent rear extremity 26 engage bearing studs 21 in a manner to enable the upper member to swing in a vertical path and slide in a horizontal plane with respect to the lower member. A locking bolt 40 having knurled control knob 41 threadably engages a hole in said upper member to contact pin chamber portion 32 of a core 33 emplaced within channel 30, thereby locking said core in place within the channel.

It is to be noted that, when the apparatus is in its closed position with a core operatively embraced by channel 30, as shown in FIG. 6, the following factors establish and fix the precise interrelationship of the combined apparatus and core:

(a) Locking bolt 40 in conjunction with forward extremities 15 and 25, and shoulder 34 prevent movement of the core with respect to channel 30.

(b) The construction of the channel prevents rearward sliding movement of the upper member when a core is emplaced therein.

(c) The upper member cannot be pivoted about the lower member because of the action of said latching means.

In use, a removable core is inserted into channel 30, as shown in FIG. 6 so that pin chambers 37 are aligned with retaining chambers 28, and locking bolt 40 is tightened. A 1/16" diameter punch tool 42 is then forced through openings in core 33 located directly above the pin chambers. Such action extrudes the components of the pin chamber into a corresponding retaining chamber 28. It is to be noted that rear extremity 16 of the lower member in conjunction with paired upright posts 20 form a flat standing surface 48. As shown in FIG. 6, said standing surface facilitates placement of the apparatus in stable abutment with a flat work surface, thereby enabling the punch tool to be driven downwardly into the core.

As shown in FIG. 3, the sequence of said removed components is: friction disc 43, spring 44, spacer rods 45 and driver pin 46. When all the pin chamber components have been extruded into their respective retaining chambers, locking bolt 40 is loosened, the core is slid out of channel 30, and the upper member is swung upwardly and rearwardly to the open state of the apparatus. In said open state, all the components of the pin chambers are precisely arranged within the troughs of the lower member, and are amenable to easy handling for measurement and accurate re-insertion into the core.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. Apparatus for holding a removable core, and receiving pin chamber components extruded therefrom, said apparatus comprising:

(a) a lower member having a flat bottom surface, opposed parallel flat side surfaces rising perpendicularly from said bottom surface, a flat upper surface in parallel disposition to said bottom surface, forward and rear extremities, each extending between said side surfaces, a first series of parallel troughs of uniform semi-circular cross sectional configuration recessed within said upper surface and perpendicularly oriented to said forward and rear extremities, a first elongated recess of cylindric contour extending between said side surfaces adjacent said forward extremity and communicating with said first series of troughs, first pivot means disposed adjacent said rear extremity above said upper surface in perpendicular relationship to said side surfaces, and latch holding means associated with said side surfaces adjacent said forward extremity, and (b) an upper member having a flat bottom surface adapted to lie in abutting contact with the upper surface of said lower member, opposed parallel flat side surfaces perpendicularly disposed to said bottom surface and disposed in coplanar relationship with the side surfaces of said lower member, forward and rear extremities adapted to lie directly above the corresponding extremities of the lower member, a second series of troughs shaped and spaced in a manner to meet with the first series of troughs to form circular cylindrical retaining chambers, a second elongated recess configured to meet with said first recess to form a core-receiving channel of cylindric contour whose cross-section comprises a least 180 degrees of circular arc, said arc being symmetrically disposed about said retaining chambers, said channel having an elongated slot which opens upon the forward extremities of said upper and lower members, locking means adjacent the forward extremity in communication with said second elongated recess, latch means interactive with the latch holding means of the lower member, and second pivot means interactive with said first pivot means to enable the upper member to swing in a vertical path and slide in a horizontal plane with respect to said lower member.

2. The apparatus of claim 1 wherein said upper and lower members are of substantially monolithic construction.

3. The apparatus of claim 2 wherein said upper and lower members are fabricated of metal by molding or machining techniques.

4. The apparatus of claim 1 wherein said second pivot means is a slot-like depression elongated along an axis parallel to the bottom surface of said upper member.

5. The apparatus of claim 1 wherein said locking means is a bolt which threadably penetrates the upper member in a direction perpendicular to said bottom surface.

6. The apparatus of claim 1 having two operational states, namely an open state wherein the upper member is positioned substantially behind the lower member, and a closed state wherein the upper member is above the lower member, thereby causing the troughs to form said retaining chambers, and causing the recesses to form said channel.

7. The apparatus of claim 6 wherein said channel is provided with positioning means which ensure that the pin chambers of the core inserted into the channel are aligned with said retaining chambers.

* * * * *